(12) United States Patent
Tokudome et al.

(10) Patent No.: US 9,023,270 B2
(45) Date of Patent: May 5, 2015

(54) METHOD FOR PRODUCING CERAMIC HONEYCOMB STRUCTURE

(75) Inventors: Osamu Tokudome, Kirishima (JP); Hirohisa Suwabe, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 399 days.

(21) Appl. No.: 11/997,350

(22) PCT Filed: Aug. 1, 2006

(86) PCT No.: PCT/JP2006/315236
§ 371 (c)(1),
(2), (4) Date: Jan. 30, 2008

(87) PCT Pub. No.: WO2007/015495
PCT Pub. Date: Feb. 8, 2007

(65) Prior Publication Data
US 2010/0096783 A1    Apr. 22, 2010

(30) Foreign Application Priority Data
Aug. 1, 2005   (JP) .................... 2005-222297

(51) Int. Cl.
| | |
|---|---|
| *C04B 38/06* | (2006.01) |
| *C04B 35/478* | (2006.01) |
| *B01D 46/24* | (2006.01) |
| *B01D 39/20* | (2006.01) |
| *C04B 38/00* | (2006.01) |
| *C04B 111/00* | (2006.01) |

(52) U.S. Cl.
CPC ........ *B01D 46/2418* (2013.01); *B01D 39/2075* (2013.01); *B01D 2279/30* (2013.01); *C04B 35/478* (2013.01); *C04B 38/0006* (2013.01); *C04B 2111/00129* (2013.01); *C04B 2111/00793* (2013.01); *C04B 2235/3217* (2013.01); *C04B 2235/3232* (2013.01); *C04B 2235/3234* (2013.01); *C04B 2235/3418* (2013.01); *C04B 2235/3472* (2013.01); *C04B 2235/5296* (2013.01); *C04B 2235/5436* (2013.01); *C04B 2235/5445* (2013.01); *C04B 2235/656* (2013.01); *C04B 2235/77* (2013.01); *C04B 2235/79* (2013.01); *F01N 2330/06* (2013.01); *F01N 2330/30* (2013.01)

(58) Field of Classification Search
USPC ........................................... 264/630
See application file for complete search history.

(56) References Cited

U.S. PATENT DOCUMENTS

| | | | | |
|---|---|---|---|---|
| 4,327,188 | A * | 4/1982 | Endo et al. ................ | 501/134 |
| 2003/0102606 | A1* | 6/2003 | Noguchi et al. ............ | 264/631 |
| 2004/0020846 | A1* | 2/2004 | Ogunwumi et al. ........ | 210/510.1 |
| 2006/0021309 | A1* | 2/2006 | Merkel ...................... | 55/523 |
| 2006/0064957 | A1* | 3/2006 | Ogunwumi et al. ......... | 55/523 |
| 2007/0006561 | A1* | 1/2007 | Brady et al. ................ | 55/523 |

FOREIGN PATENT DOCUMENTS

| | | | |
|---|---|---|---|
| EP | 1533032 | A1 * | 5/2005 |
| JP | 62-40061 | B2 | 8/1987 |

(Continued)

*Primary Examiner* — Erin Snelting
(74) *Attorney, Agent, or Firm* — Sughrue Mion, PLLC

(57) ABSTRACT

A method for producing a ceramic honeycomb structure comprising aluminum titanate as a main crystal, comprising the steps of mixing titania powder, alumina powder and amorphous silica powder, the molar ratio of the titania powder to the alumina powder being 45:55 to 55:45, the amount of the amorphous silica powder being 1-10 parts by mass per 100 parts by mass of the total of the titania powder and the alumina powder, to produce a moldable material; extruding said moldable material in a honeycomb shape; drying it; and then sintering it at 1300-1700° C.

6 Claims, 1 Drawing Sheet

(56) References Cited

FOREIGN PATENT DOCUMENTS

| JP | 01-183463 A | 7/1989 |
| JP | 01-308868 A | 12/1989 |
| JP | 07-025662 A | 1/1995 |
| JP | 08-290963 A | 11/1996 |
| JP | 10-299454 A | 11/1998 |
| JP | 2005-087797 A | 4/2005 |
| WO | 2004/011124 A1 | 2/2004 |
| WO | 2006/039255 A2 | 4/2006 |
| WO | 2006/039255 A3 | 4/2006 |

* cited by examiner

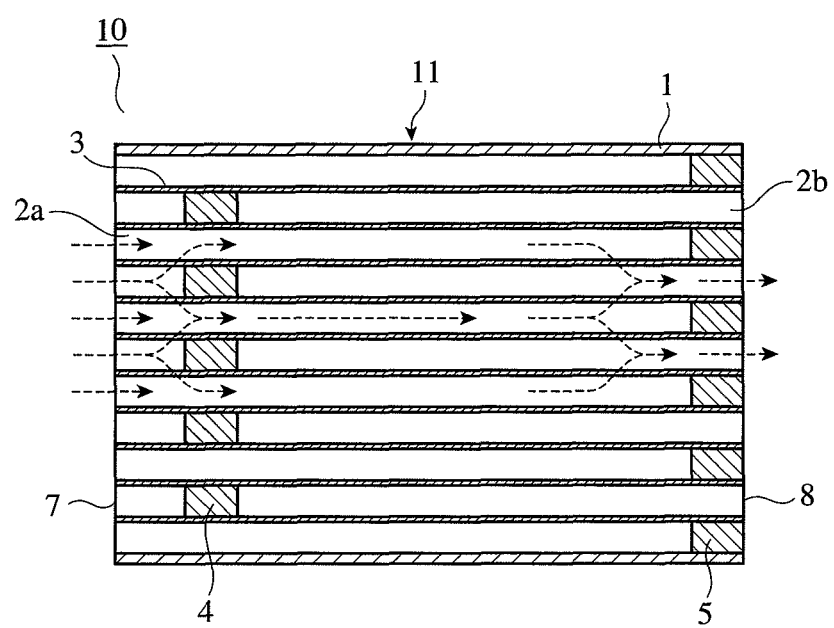

METHOD FOR PRODUCING CERAMIC HONEYCOMB STRUCTURE

FIELD OF THE INVENTION

The present invention relates to a method for producing a ceramic honeycomb structure suitable for a ceramic honeycomb filter for removing particulate from an exhaust gas discharged from diesel engines.

BACKGROUND OF THE INVENTION

To protect global environment, ceramic honeycomb filters for removing carbon-based particulate from exhaust gases discharged from diesel engines are used. Because a ceramic honeycomb filter comprises a ceramic honeycomb structure having cell walls constituting large numbers of flow paths, whose inlets and outlets are alternately plugged, the cell walls are clogged with a large amount of particulate captured, resulting in high pressure loss. It is necessary to burn the captured particulate to regenerate the ceramic honeycomb filter. The ceramic honeycomb filter is thus required to be able to capture particulate and withstand the repeated burning of particulate, so that the ceramic honeycomb filter have high heat resistance and heat shock resistance. Accordingly, it has conventionally been made of cordierite ($5SiO_2$-$2Al_2O_3$-$2MgO$). However, the ceramic honeycomb filter is likely heated to temperatures exceeding 1450° C., the melting point of cordierite, by heat generated by the burning of particulate. When the temperature of the filter exceeds the melting point of cordierite, the cell walls are partially melted, resulting in a low particulate-capturing ratio. Investigation has thus been made to form a ceramic honeycomb structure with aluminum titanate ($Al_2TiO_5$) having a melting point of about 1860° C.

Although aluminum titanate has a high melting point and a small thermal expansion coefficient, it has a large anisotropy in a thermal expansion coefficient, resulting in high likelihood of generating micro-cracks between crystal grains, and thus decreased mechanical strength. In addition, the aluminum titanate crystals have low thermal stability, because they are easily decomposed to $TiO_2$ (rutile) and $Al_2O_3$ (corundum) at temperatures of 750-1200° C.

JP 62-40061 B discloses a ceramic honeycomb having high heat resistance, high porosity, high compression strength and low thermal expansion coefficient, which is made of 85% or more by mass of aluminum titanate and 4-10% by mass of $SiO_2$, and which has a thermal expansion ratio of 0.15% or less when heated to 1000° C., compression strength of 350 kg/cm$^2$ or more (converted to the value when an opening ratio is 0), and porosity of 35% or more. JP 62-40061 B describes that aluminum titanate synthesized in the presence of $SiO_2$-containing clay (crystalline clay such as kaolin) is preferably used to produce the ceramic honeycomb. However, a ceramic honeycomb made of aluminum titanate synthesized in the presence of clay does not have sufficient thermal stability at temperatures of 750-1200° C.

JP 7-25662 A describes that the sintering of ceramic powder comprising 0.3-5.6% by mass of $SiO_2$, and 0.7-14.4% by mass of $Al_2O_3$, the balance being aluminum titanate, provides composite ceramics of aluminum titanate and mullite having improved mechanical strength and high-temperature thermal stability, without losing a high melting point and a low thermal expansion coefficient inherent in aluminum titanate. It is described that $SiO_2$ added to aluminum titanate may be crystalline such as quartz, tridymite, cristobalite, etc. or amorphous, and that $Al_2O_3$ added to aluminum titanate may be crystalline such as $\alpha$-$Al_2O_3$, $\gamma$-$Al_2O_3$, etc. or amorphous. However, mullite-containing sintered aluminum titanate produced by adding $SiO_2$ powder and $Al_2O_3$ powder to aluminum titanate powder is disadvantageous in insufficient thermal stability, and a large thermal expansion coefficient because of a large thermal expansion coefficient of mullite.

The aluminum titanate synthesized in the presence of crystalline $SiO_2$ (JP 62-40061 B), and the mullite-containing aluminum titanate produced by adding amorphous or crystalline $SiO_2$ powder and $Al_2O_3$ powder to aluminum titanate powder (JP 7-25662 A) have thermal stability improved to some extent compared with aluminum titanate without $SiO_2$, but it is still not enough to solve the problem that aluminum titanate is thermally decomposed to $TiO_2$ (rutile) and $Al_2O_3$ (corundum) at temperatures of 750-1200° C. Accordingly, ceramic honeycomb structures made of aluminum titanate as a main component have not been put into practical use yet.

OBJECT OF THE INVENTION

Accordingly, an object of the present invention is to provide a method for producing a ceramic honeycomb structure comprising aluminum titanate as a main crystal, the ceramic honeycomb structure having excellent thermal stability at 750-1200° C.

DISCLOSURE OF THE INVENTION

As a result of intense research in view of the above object, the inventors have found that the use of a starting material powder obtained by adding amorphous silica powder to titania powder and alumina powder, the titania powder and the alumina powder being substantially at an equimolar ratio, provides a ceramic honeycomb structure made of aluminum titanate free from the problem of low thermal stability in JP 62-40061 B, and the problems of low thermal stability and a large thermal expansion coefficient in JP 7-25662 A. The present invention has been completed based on such finding.

Thus, the method of the present invention for producing a ceramic honeycomb structure comprising aluminum titanate as a main crystal, comprises the steps of mixing titania powder, alumina powder and amorphous silica powder, the molar ratio of the titania powder to the alumina powder being 45:55 to 55:45, the amount of the amorphous silica powder being 1-10 parts by mass per 100 parts by mass of the total of the titania powder and the alumina powder, to produce a moldable material; extruding said moldable material in a honeycomb shape; drying it; and then sintering it at 1300-1700° C.

The amorphous silica powder is preferably composed of molten silica obtained by melting high-purity silica stone at high temperatures. Said amorphous silica powder preferably has an average particle size of 2-30 μm, and an aspect ratio of 1-7. Said titania powder preferably has an average particle size of 0.05-3 μm. Said alumina powder preferably has an average particle size of 0.1-5 μm.

The ceramic honeycomb filter of the present invention comprises a ceramic honeycomb structure comprising aluminum titanate as a main crystal, the ceramic honeycomb structure having cell walls which partition large numbers of flow paths, and plugs sealing the flow paths, such that an exhaust gas passes through said cell walls, said ceramic honeycomb structure being produced by mixing titania powder, alumina powder and amorphous silica powder, the molar ratio of the titania powder to the alumina powder being 45:55 to 55:45, the amount of the amorphous silica powder being 1-10 parts by mass per 100 parts by mass of the total of the titania powder and the alumina powder, to produce a moldable material; extruding said moldable material in a honeycomb shape; drying it; and then sintering it at 1300-1700° C.

The above production method provides a ceramic honeycomb structure made of aluminum titanate as a main crystal and having a small thermal expansion coefficient, and improved thermal stability at 750-1200° C.

BRIEF DESCRIPTION OF THE DRAWINGS

FIG. 1 is a schematic cross-sectional view showing one example of ceramic honeycomb filters, which can be produced using the ceramic honeycomb structure of the present invention.

DESCRIPTION OF THE BEST MODE OF THE INVENTION

[1] Production Method of Ceramic Honeycomb Structure

The method of the present invention for producing a ceramic honeycomb structure made of aluminum titanate as a main crystal comprises the steps of mixing titania powder, alumina powder and amorphous silica powder, the molar ratio of the titania powder to the alumina powder being 45:55 to 55:45, the amount of the amorphous silica powder being 1-10 parts by mass per 100 parts by mass of the total of the titania powder and the alumina powder, to produce a moldable material; extruding said moldable material in a honeycomb shape; drying it; and then sintering it at 1300-1700° C.

(1) Starting Material Powder for Aluminum Titanate
(a) Titania Powder

The titania powder preferably has an average particle size of 0.05-3 μm. When the average particle size of the titania powder is less than 0.05 μm, a large amount of water should be added when producing the moldable material, resulting in cracking during drying. When the average particle size exceeds 3 μm, the aluminum titanate is not fully synthesized. The more preferred average particle size of the titania powder is 0.1-2 μm.

The titania powder preferably has an aspect ratio of 1-3 and purity of 98% or more. The crystal type of the titania powder may be either anatase or rutile.

(b) Alumina Powder

The alumina powder preferably has an average particle size of 0.1-5 μm. When the average particle size of the alumina powder is less than 0.1 μm, a large amount of water should be added when producing the moldable material, resulting in cracking during drying. When the average particle size exceeds 5 μm, the aluminum titanate is not fully synthesized. The more preferred average particle size of the alumina powder is 0.5-3 μm.

The alumina powder preferably has an aspect ratio of 1-3 and purity of 98% or more. The alumina powder preferably has a larger particle size than that of the titania powder to synthesize aluminum titanate.

(c) Mixing Ratio

Because aluminum titanate is formed by the stoichiometric reaction of titania and alumina, the titania powder and the alumina powder are ideally at an equimolar ratio. However, even if they are not completely equimolar, aluminum titanate crystals suitable for the ceramic honeycomb structure can be obtained. Accordingly, the titania powder and the alumina powder need only be substantially at an equimolar ratio, specifically the molar ratio of the titania powder to the alumina powder is preferably 45:55 to 55:45, more preferably 48:52 to 52:48.

(2) Amorphous Silica

The amorphous silica powder is preferably molten silica obtained by completely melting high-purity silica stone at high temperatures. As long as it is amorphous, the molten silica powder may be either pulverized or spherical one. The pulverized amorphous silica powder can be produced, for instance, by melting high-purity natural silica stone at high temperatures to produce an ingot, finely pulverizing the ingot, and classifying the resultant powder. The spherical amorphous silica powder can be produced, for instance, by spraying the finely pulverized high-purity natural silica stone into a high-temperature flame, thereby conducting the melting and spheroidization of the silica stone powder at the same time. In any case, the purity of the molten silica is preferably 99% or more, more preferably 99.5% or more.

The amorphous silica powder preferably has an average particle size of 2-30 μm. Because the pulverized amorphous silica particles have relatively sharp edges, the average particle size exceeding 30 μm results in the clogging of die slits as narrow as, for instance, about 0.3 mm with the amorphous silica powder when the moldable material passes through the die slits during extrusion. Thus, cracking tends to occur in the cell walls of the ceramic honeycomb structure. The spherical amorphous silica powder has good extrudability when it has an average particle size of 30 μm or less. The lower limit of the average particle size less than 2 μm leads to a large specific surface area, needing a large amount of water to produce the moldable material, resulting in a molding having low self-supportability and cracking in cell walls when dried. The more preferred average particle size of the amorphous silica powder is 10-25 μm. In any powder, its average particle size is measured by a laser diffraction method.

The amorphous silica powder preferably has an aspect ratio of 1-7. When the aspect ratio exceeds 7, pore-forming materials such as foamed resin particles, wheat powder, etc. added to impart porosity to the ceramic honeycomb structure are broken during blending, failing to obtain the desired porosity and pore size distribution. The aspect ratio is further preferably 1-5, most preferably 1-2. The aspect ratio is determined by measuring the longer diameters and shorter diameters of 10 particles arbitrarily selected in a SEM photograph, and averaging longer diameter/shorter diameter ratios.

1-10 parts by mass of the amorphous silica powder is added to 100 parts by mass of the total of the titania powder and the alumina powder. When the amorphous silica powder is less than 1 part by mass, no effect of improving thermal stability at 750-1200° C. can be obtained. When the amorphous silica powder is more than 10 parts by mass, the resultant ceramic honeycomb structure has a large thermal expansion coefficient. The amorphous silica powder content is more preferably 2-6 parts by mass.

(3) Other Additives

In the production of the ceramic honeycomb structure made of aluminum titanate as a main crystal, one or more of $Fe_2O_3$, $ZrO_2$, MgO, CaO, etc. may be added as additives for improving the thermal stability of aluminum titanate, in addition to the titania powder, the alumina powder and the amorphous silica powder.

The moldable material comprising the titania powder, the alumina powder and the amorphous silica powder may contain a binder such as methylcellulose, a pore-forming material, etc. The pore-forming material is preferably wheat powder, graphite, foamed resin particles. Among them, the foamed resin particles are preferable, and their addition in an amount of 5-20 parts by mass per 100 parts by mass of the total of the titania powder, the alumina powder and the amorphous silica powder provides a porosity of 50% or more. The foamed resin particles are added more preferably in an amount of 8-15 parts by mass.

(4) Sintering Temperature

The moldable material extrudate is dried, and then sintered at 1300-1700° C. When the sintering temperature is lower than 1300° C., aluminum titanate is not fully synthesized. When the sintering temperature is higher than 1700° C., the resultant ceramic honeycomb structure has a large thermal expansion coefficient. The preferred sintering temperature is 1400-1600° C. As long as the sintering temperature is in a range from 1400° C. to 1600° C., the thermal expansion coefficient is sufficiently small.

[2] Ceramic Honeycomb Structure

The ceramic honeycomb structure obtained by the method of the present invention comprises 90% or more by mass of aluminum titanate, the balance being substantially sub-components such as amorphous $SiO_2$, etc., and may contain trace amounts (2% or less by mass) of unreacted $TiO_2$ and $Al_2O_3$. Trace amounts of other elements than Al, Ti and O, such as Si, etc. may be dissolved in the aluminum titanate. Because mullite-containing aluminum titanate has a large thermal expansion coefficient, the mullite content is preferably 2 parts or less by mass, more preferably 0.5 parts or less by mass, per 100 parts by mass of the aluminum titanate.

The ceramic honeycomb structure thus produced has a small thermal expansion coefficient, and excellent thermal stability at 750-1200° C. The thermal expansion coefficient is preferably $2 \times 10^{-6}$/° C. or less on average in a range from 35° C. to 800° C. It may be considered that because the titania powder and the alumina powder are sintered in the presence of the amorphous silica to synthesize the aluminum titanate, Si is dissolved in the aluminum titanate in place of part of Al, thereby improving the thermal stability without deteriorating the advantage of aluminum titanate that has a small thermal expansion coefficient.

[3] Ceramic Honeycomb Filter

As shown in FIG. 1, a ceramic honeycomb filter 10 obtained by plugging large numbers of flow paths partitioned by cell walls of the ceramic honeycomb structure made of aluminum titanate as a main crystal comprises a porous ceramic honeycomb structure 11 having a peripheral portion 1 and porous cell walls 3 constituting pluralities of flow paths 2a, 2b, and plugs 4, 5 sealing end portions of the flow paths 2a, 2b alternately in a checkerboard pattern. A particulate-containing exhaust gas flows into the flow paths 2a through inlet openings 7, passes through the cell walls 3, enters into the adjacent flow paths 2b, and then exits from outlet openings 8, during which particulate contained in the exhaust gas is captured by pores (not shown) in the cell walls 3.

The present invention will be explained in more detail with reference to Examples below without intention of restricting the scope of the present invention.

EXAMPLE 1

As shown in Table 1, 1 part by mass of amorphous silica powder (purity: 99.5%, average particle size: 1.0 μm, and aspect ratio: 3) was added to 100 parts by mass of the total of rutile-type titania powder (average particle size: 0.2 μm, and purity: 99.6%) and alumina powder (average particle size: 0.08 μm, and purity: 99.8%) at a molar ratio of 50:50, and 12 parts by mass of foamed resin particles and 6 parts by mass of methylcellulose were mixed with 100 parts by mass of the total of the titania powder, the alumina powder and the amorphous silica powder. Thereafter, blending was conducted with water added, to produce a moldable material. The aspect ratio of the amorphous silica powder was determined by measuring the longer and shorter lengths of 10 powder particles arbitrarily selected in a SEM photograph of the powder, and calculating an average ratio of the longer diameter to the shorter length. The moldable material was extruded from a honeycomb-structure-forming die to provide a honeycomb structure molding. The molding was dried, and then sintered at 1300° C. in the air, to obtain a ceramic honeycomb structure made of aluminum titanate as a main crystal, which had an outer diameter of 50 mm, a length of 90 mm, a cell wall thickness of 0.32 mm and a cell wall pitch of 1.6 mm.

The ceramic honeycomb structure was observed with respect to the cracking of cell walls that occurred when extruded, and evaluated by the following standards. The results are shown in Table 2.

Excellent: No cracking occurred in cell walls at all.
Good: Slight cracking occurred in cell walls, causing no practical problems.

Test pieces cut out of the ceramic honeycomb structure were measured by the following methods with respect to an average thermal expansion coefficient, a porosity, and thermal stability at 1000° C. The results are shown in Table 2.

(1) Average Thermal Expansion Coefficient

Using a thermomechanical analyzer (TMA) of a compression load type and a differential expansion type (Thermo Plus available from Rigaku Corp.), the thermal expansion coefficient of a test piece of 4.8 mm×4.8 mm×50 mm, which was cut out of the ceramic honeycomb structure such that its length was substantially identical to that of the flow paths, was measured by heating it from 35° C. to 800° C. at temperature-elevating speed of 10° C./minute and at a constant load of 20 g, and averaged to determine an average thermal expansion coefficient between 35° C. and 800° C.

(2) Porosity

A test piece of 12.8 mm×12.8 mm×10 mm was put in a measurement cell of AutoPore III available from Micromeritics Instrument Corp., and the cell was evacuated to cause mercury to enter pores of the test piece, to measure the total volume V ($cm^3$/g) of the pores. The total volume V and the true specific gravity ρ (=3.4 $cm^3$/g) of aluminum titanate were used to determine the porosity P [=(100×V×ρ)/(1+V×ρ)](%).

(3) Thermal Stability at 1000° C.

Before and after heat-treating a test piece of 10 mm×10 mm×10 mm in an electric furnace having an air atmosphere at 1000° C. for 20-100 hours, the X-ray diffraction intensities of aluminum titanate and $TiO_2$ (rutile) in the test piece were measured. Determined from the diffraction intensity ($I_{AT(023)}$) of a (023) plane of aluminum titanate and the diffraction intensity ($I_{TiO2(110)}$) of a (110) plane of $TiO_2$ (rutile) was the ratio of aluminum titanate R [=$I_{AT(023)}$/$I_{AT(023)}$+$I_{TiO2(110)}$)] before and after the heat treatment, and its change ratio X [=(R after heat treatment/R before heat treatment)×100(%)] was used to evaluate the thermal stability at 1000° C.

EXAMPLES 2-6

A ceramic honeycomb structure made of aluminum titanate as a main crystal was produced in the same manner as in Example 1 except for changing the average particle size and purity of the titania powder and the alumina powder, the average particle size, purity, aspect ratio and amount of the amorphous silica powder, and the sintering temperature as shown in Table 1, and the cracking of cell walls, the average thermal expansion coefficient, the porosity, and the thermal stability at 1000° C. were evaluated. The results are shown in Table 2.

EXAMPLES 7-9

A ceramic honeycomb structure made of aluminum titanate as a main crystal was produced in the same manner as in Example 6 except for changing the amount of the amorphous silica powder as shown in Table 1, and the cracking of cell walls, the thermal expansion coefficient, the porosity, and the thermal stability at 1000° C. were evaluated. The results are shown in Table 2.

A resin film was attached to an end surface of the ceramic honeycomb structure, and provided with holes by a laser to provide flow paths in a checkerboard pattern. Each end of the ceramic honeycomb structure was immersed in a plugging slurry of aluminum titanate, so that the plugging slurry entered into end portions of the flow paths through the holes of the film, thereby forming plugs as long as about 10 mm. After drying the plugs, sintering was conducted at 1400° C. to integrally bond the plugs to the cell walls, thereby obtaining a ceramic honeycomb filter having exhaust-gas-passing cell walls. An exhaust gas at 150-300° C. discharged from a diesel engine was caused to pass through this filter for 5 hours. As a result, particulate were captured with no problems.

EXAMPLES 10-12

A ceramic honeycomb structure was produced in the same manner as in Example 7 except for changing the sintering temperature as shown in Table 1, and the cracking of cell walls, the thermal expansion coefficient, the porosity, and the thermal stability at 1000° C. were evaluated. The results are shown in Table 2.

EXAMPLES 13 AND 14

A ceramic honeycomb structure was produced in the same manner as in Example 7 except for changing the aspect ratio of the amorphous silica powder as shown in Table 1, and the cracking of cell walls, the thermal expansion coefficient, the porosity, and the thermal stability at 1000° C. were evaluated. The results are shown in Table 2.

COMPARATIVE EXAMPLE 1 and 2

A ceramic honeycomb structure made of aluminum titanate as a main crystal was produced in the same manner as in Example 1 except for changing the average particle size and amount of the amorphous silica powder and the sintering temperature of the extrudate as shown in Table 1, and the cracking of cell walls, the thermal expansion coefficient, the porosity, and the thermal stability at 1000° C. were evaluated. The results are shown in Table 2.

COMPARATIVE EXAMPLE 3

A ceramic honeycomb structure made of aluminum titanate as a main crystal was produced in the same manner as in Example 1 except for using crystalline silica powder shown in Table 1 in place of the amorphous silica powder, and the cracking of cell walls, the thermal expansion coefficient, the porosity, and the thermal stability at 1000° C. were evaluated. The results are shown in Table 2.

COMPARATIVE EXAMPLE 4

1.5 parts by mass of amorphous silica powder (purity: 99.5%, average particle size: 1.0 μm, aspect ratio: 3), and 3.8 parts by mass of alumina powder (purity: 99.5%, average particle size: 0.2 μm) were added to 100 parts by mass of pulverized powder of aluminum titanate synthesized from an equimolar ratio of titania powder and alumina powder each having the same average particle size and purity as in Example 1, and 12 parts by mass of foamed resin particles and 6 parts by mass of methylcellulose were mixed with 100 parts by mass of the total of the aluminum titanate powder, the amorphous silica powder and the alumina powder. Blending was conducted with water added, to produce a moldable material. A ceramic honeycomb structure made of aluminum titanate as a main crystal was produced from the moldable material in the same manner as in Example 1, and the cracking of cell walls, the thermal expansion coefficient, the porosity, and the thermal stability at 1000° C. were evaluated. The results are shown in Table 2.

COMPARATIVE EXAMPLES 5 AND 6

A ceramic honeycomb structure was produced in the same manner as in Example 7 except for changing the sintering temperature, and the cracking of cell walls, the thermal expansion coefficient, the porosity, and the thermal stability at 1000° C. were evaluated. The results are shown in Table 2.

COMPARATIVE EXAMPLE 7

A ceramic honeycomb structure was produced in the same manner as in Example 7 except that potash feldspar, a crystalline mineral having a chemical composition of $KAlSi_3O_8$, which had an $SiO_2$ content of 73%, an average particle size of 19 μm and an aspect ratio of 5, was used in place of the amorphous silica powder, and that the amount of the potash feldspar was 3 parts by mass per 100 parts by mass of the total of the titania powder and the alumina powder, and the cracking of cell walls, the thermal expansion coefficient, the porosity, and the thermal stability at 1000° C. were evaluated. The results are shown in Table 2.

TABLE 1

| | Titania Powder | | Alumina Powder | |
|---|---|---|---|---|
| No. | Average Particle Size (μm) | Purity (%) | Average Particle Size (μm) | Purity (%) |
| Example 1 | 0.2 | 99.6 | 0.08 | 99.8 |
| Example 2 | 2.0 | 99.2 | 3.0 | 99.5 |
| Example 3 | 1.0 | 99.5 | 0.1 | 99.5 |
| Example 4 | 2.0 | 99.2 | 5.0 | 99.1 |
| Example 5 | 0.8 | 99.3 | 1.1 | 99.3 |
| Example 6 | 2.0 | 99.7 | 1.1 | 99.6 |
| Example 7 | 2.0 | 99.7 | 1.1 | 99.6 |
| Example 8 | 2.0 | 99.7 | 1.1 | 99.6 |
| Example 9 | 2.0 | 99.7 | 1.1 | 99.6 |
| Example 10 | 2.0 | 99.7 | 1.1 | 99.6 |
| Example 11 | 2.0 | 99.7 | 1.1 | 99.6 |
| Example 12 | 2.0 | 99.7 | 1.1 | 99.6 |
| Example 13 | 2.0 | 99.7 | 1.1 | 99.6 |
| Example 14 | 2.0 | 99.7 | 1.1 | 99.6 |
| Com. Ex. 1 | 0.2 | 99.6 | 0.08 | 99.8 |
| Com. Ex. 2 | 0.2 | 99.6 | 0.08 | 99.8 |
| Com. Ex. 3 | 0.2 | 99.6 | 0.08 | 99.8 |
| Com. Ex. 4 | — | — | 0.2 | 99.5 |
| Com. Ex. 5 | 2.0 | 99.7 | 1.1 | 99.6 |
| Com. Ex. 6 | 2.0 | 99.7 | 1.1 | 99.6 |
| Com. Ex. 7 | 2.0 | 99.7 | 1.1 | 99.6 |

TABLE 1-continued

| | | Silica Powder | | | |
|---|---|---|---|---|---|
| No. | Structure | Average Particle Size (μm) | Purity (%) | Aspect Ratio | Amount (parts by mass)* |
| Example 1 | Amorphous | 1.0 | 99.5 | 3 | 1 |
| Example 2 | Amorphous | 33.0 | 99.6 | 1 | 10 |
| Example 3 | Amorphous | 2.0 | 99.3 | 2 | 5 |
| Example 4 | Amorphous | 30.0 | 99.5 | 6 | 8 |
| Example 5 | Amorphous | 21.5 | 99.8 | 3 | 3 |
| Example 6 | Amorphous | 22.0 | 99.8 | 3 | 1 |
| Example 7 | Amorphous | 22.0 | 99.8 | 3 | 3 |
| Example 8 | Amorphous | 22.0 | 99.8 | 3 | 6 |
| Example 9 | Amorphous | 22.0 | 99.8 | 3 | 10 |
| Example 10 | Amorphous | 22.0 | 99.8 | 3 | 3 |
| Example 11 | Amorphous | 22.0 | 99.8 | 3 | 3 |
| Example 12 | Amorphous | 22.0 | 99.8 | 3 | 3 |
| Example 13 | Amorphous | 22.0 | 99.8 | 2 | 3 |
| Example 14 | Amorphous | 22.0 | 99.8 | 8 | 3 |
| Com. Ex. 1 | Amorphous | 1.0 | 99.5 | 3 | 0.8 |
| Com. Ex. 2 | Amorphous | 33.0 | 99.5 | 3 | 20 |
| Com. Ex. 3 | Crystalline | 1.0 | 99.0 | 4 | 1 |
| Com. Ex. 4 | Amorphous | 1.0 | 99.5 | 3 | 1.5 |
| Com. Ex. 5 | Amorphous | 22.0 | 99.8 | 3 | 3 |
| Com. Ex. 6 | Amorphous | 22.0 | 99.8 | 3 | 3 |
| Com. Ex. 7 | — | — | — | — | — |

| | Other Additives | | Sintering |
|---|---|---|---|
| No. | Type | Parts by Mass | Temperature (° C.) |
| Example 1 | — | — | 1300 |
| Example 2 | — | — | 1700 |
| Example 3 | — | — | 1400 |
| Example 4 | — | — | 1400 |
| Example 5 | — | — | 1400 |
| Example 6 | — | — | 1400 |
| Example 7 | — | — | 1400 |
| Example 8 | — | — | 1400 |
| Example 9 | — | — | 1400 |
| Example 10 | — | — | 1300 |
| Example 11 | — | — | 1500 |
| Example 12 | — | — | 1700 |
| Example 13 | — | — | 1400 |
| Example 14 | — | — | 1400 |
| Com. Ex. 1 | — | — | 1300 |
| Com. Ex. 2 | — | — | 1700 |
| Com. Ex. 3 | — | — | 1300 |
| Com. Ex. 4 | Synthetic Aluminum Titanate Powder | 100 | 1300 |
| Com. Ex. 5 | — | — | 1200 |
| Com. Ex. 6 | — | — | 1800 |
| Com. Ex. 7 | Potash Feldspar | 3 | 1400 |

Note:
*Parts by mass per 100 parts by mass of the total of the titania powder and the alumina powder.

TABLE 2

| No. | Cracking of Cell Walls | Average Thermal Expansion Coefficient ($\times 10^{-6}$/° C.) | Porosity (%) | Thermal Stability (%) at 1000° C. |
|---|---|---|---|---|
| Example 1 | Good | 1.5 | 55 | 90 |
| Example 2 | Good | 1.4 | 60 | 98 |
| Example 3 | Excellent | 1.2 | 55 | 97 |
| Example 4 | Excellent | 1.1 | 50 | 98 |
| Example 5 | Excellent | 1.1 | 55 | 99 |
| Example 6 | Excellent | 1.3 | 60 | 94 |
| Example 7 | Excellent | 1.1 | 59 | 99 |
| Example 8 | Excellent | 1.2 | 59 | 99 |
| Example 9 | Excellent | 1.6 | 60 | 98 |
| Example 10 | Excellent | 1.8 | 59 | 92 |
| Example 11 | Excellent | 1.0 | 58 | 100 |
| Example 12 | Excellent | 1.7 | 60 | 100 |
| Example 13 | Excellent | 1.1 | 62 | 99 |
| Example 14 | Excellent | 1.2 | 48 | 99 |
| Com. Ex. 1 | Good | 3.5 | 54 | 60 |
| Com. Ex. 2 | Good | 3.8 | 56 | 65 |
| Com. Ex. 3 | Good | 2.1 | 52 | 45 |
| Com. Ex. 4 | Good | 2.5 | 55 | 40 |
| Com. Ex. 5 | Good | 4.0 | 56 | 51 |
| Com. Ex. 6 | Good | 3.6 | 55 | 100 |
| Com. Ex. 7 | Good | 1.4 | 48 | 40 |

It is clear from Table 2 that the ceramic honeycomb structures of Examples 1-14 had high porosity and thermal stability while keeping as small thermal expansion coefficients as $2.0 \times 10^{-6}$/° C. or less, which are peculiar to aluminum titanate. Particularly the ceramic honeycomb structure of Example 11 suffered no cracking of cell walls during extrusion, and had as small an average thermal expansion coefficient as $1.0 \times 10^{-6}$/° C. and as high porosity as 58%, being excellent in thermal stability, because it was produced under the preferred conditions that the average particle size was 0.05-3 μm for the titania powder, 0.1-5 μm for the alumina powder, and 2-30 μm for the amorphous silica powder, that the amorphous silica powder had an aspect ratio of 1-5, that the amorphous silica powder content was 2-6 parts by mass, and that the sintering temperature was 1400-1600° C. Accordingly, it was suitable for a ceramic honeycomb filter for removing particulate from an exhaust gas discharged from a diesel engine.

On the other hand, the ceramic honeycomb structures of Comparative Examples 1-6 had larger thermal expansion coefficients than those of the ceramic honeycomb structures of Examples 1-14, and the ceramic honeycomb structure of Comparative Example 7 had poorer thermal stability despite a relatively small thermal expansion coefficient. Particularly the honeycomb structures of Comparative Examples 1 and 2 had thermal expansion coefficients exceeding $2.0 \times 10^{-6}$/° C. and low thermal stability because of an improper amorphous silica powder content. The ceramic honeycomb structures of Comparative Examples 3 and 7 had low thermal stability, because crystalline silica or potash feldspar was used. Because amorphous silica powder and alumina powder were added to aluminum titanate powder synthesized in advance in Comparative Example 4, a composite sintered body of aluminum titanate and mullite having a large thermal expansion coefficient and low thermal stability was formed. The ceramic honeycomb structures of Comparative Examples 5 and 6 had thermal expansion coefficients exceeding $2.0 \times 10^{-6}$/° C., because of improper sintering temperatures.

EFFECT OF THE INVENTION

Ceramic honeycomb structures made of aluminum titanate as a main crystal, which were produced by the method of the present invention, have excellent thermal stability at 750-1200° C. as well as small thermal expansion coefficients. Accordingly, ceramic honeycomb filters using such ceramic honeycomb structures are not melted even at high temperatures when accumulated fine carbon particles are burned.

What is claimed is:
1. A method for producing a ceramic honeycomb structure comprising aluminum titanate as a main crystal, comprising the steps of mixing
ceramic powder consisting of titania powder, alumina powder and amorphous silica powder having a purity of 99.5% or more, the molar ratio of the titania powder to the alumina powder being 48:52 to 52:48, the amount of the amorphous silica powder being 2-6 parts by mass per 100 parts by mass of the total of the titania powder and the alumina powder,
a binder,
a single pore-forming material, and
water, to produce a moldable material;
extruding said moldable material in a honeycomb shape;
drying said moldable material in a honeycomb shape; and then
sintering said moldable material in a honeycomb shape at 1400-1700° C.,
wherein said single pore-forming material consists of one item selected from the group consisting of wheat powder, graphite, and foamed resin particles.

2. The method for producing a ceramic honeycomb structure according to claim 1, wherein amorphous silica powder is composed of molten silica obtained by melting silica stone.

3. The method for producing a ceramic honeycomb structure according to claim 1, wherein said amorphous silica powder has an average particle size of 2-30 μm.

4. The method for producing a ceramic honeycomb structure according to claim 1, wherein said amorphous silica powder has an aspect ratio of 1-7.

5. The method for producing a ceramic honeycomb structure according claim 1, wherein said titania powder has an average particle size of 0.05-3 μm.

6. The method for producing a ceramic honeycomb structure according to claim 1, wherein said alumina powder has an average particle size of 0.1-5 μm.

* * * * *